April 6, 1948. F. T. LINSTROM 2,439,092
APPARATUS FOR INDICATING PRESSURE AT A DISTANCE
Filed Sept. 26, 1946 2 Sheets-Sheet 2
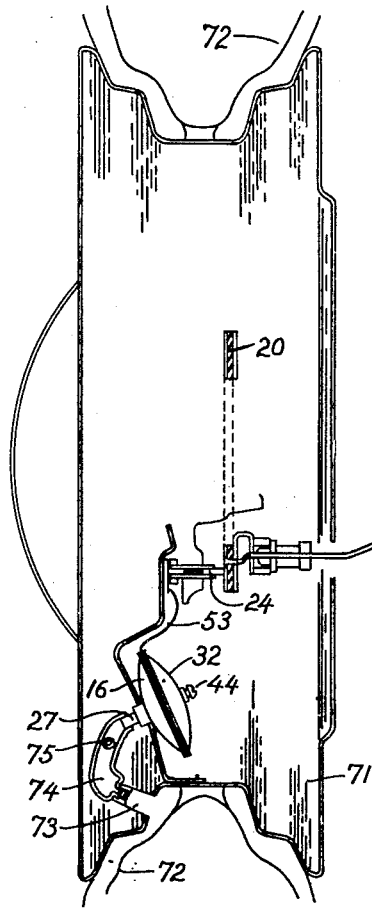
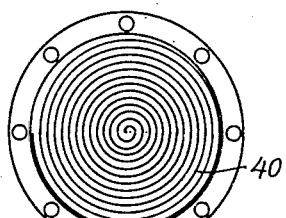
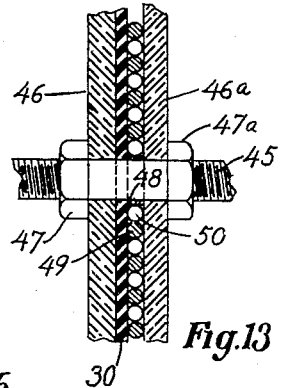
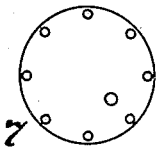
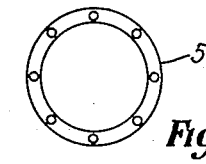
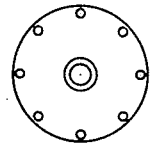
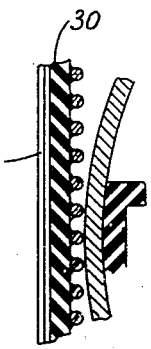
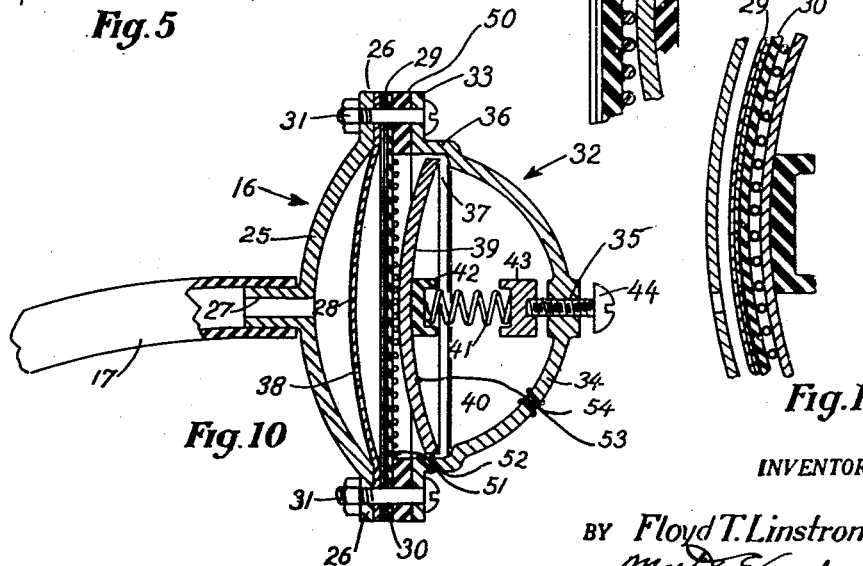
INVENTOR.
BY Floyd T. Linstrom
ATTORNEY

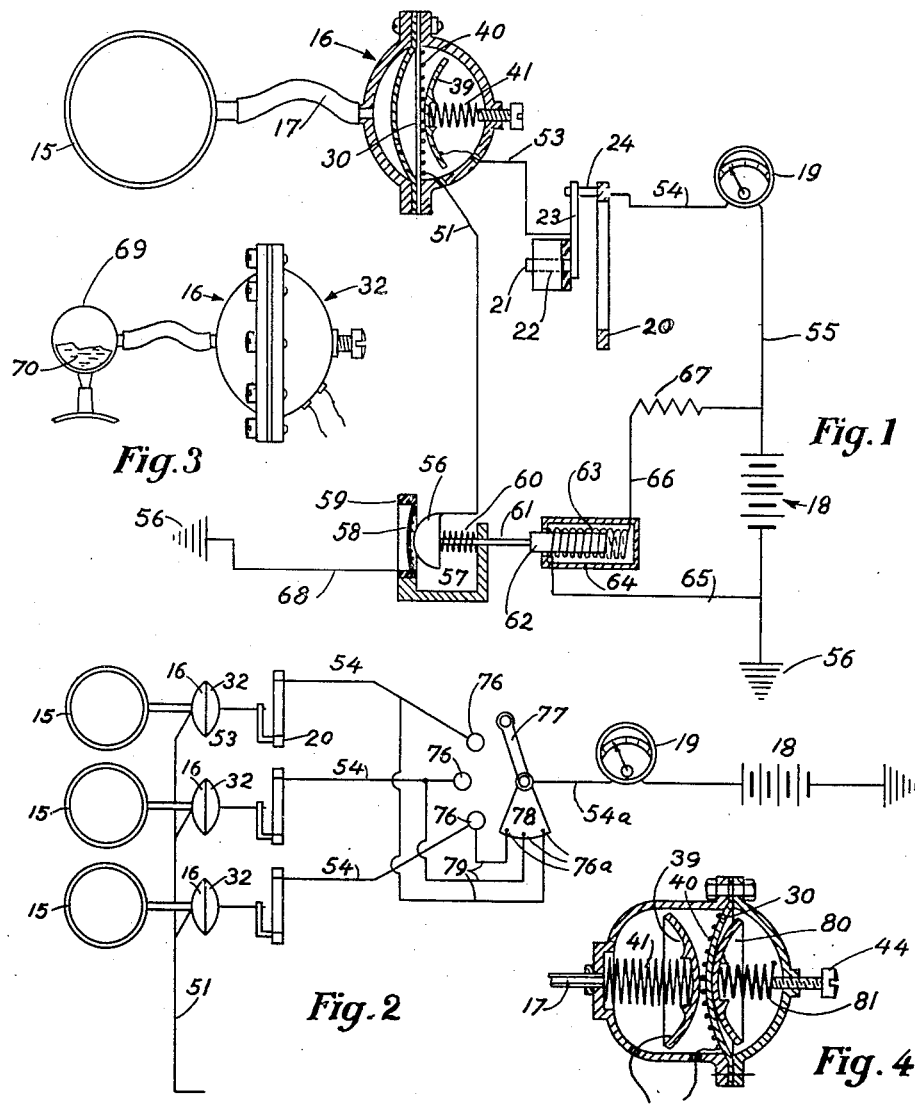

Patented Apr. 6, 1948

2,439,092

UNITED STATES PATENT OFFICE 2,439,092

APPARATUS FOR INDICATING PRESSURE AT A DISTANCE

Floyd T. Linstrom, Denver, Colo., assignor of one-third to Gerald B. Waldron and one-third to Charles H. Callison, both of Denver, Colo.

Application September 26, 1946, Serial No. 699,541

3 Claims. (Cl. 201—48)

This invention relates to improvements in pressure responsive resistance units for use in indicating, at a distance, the pressure of a fluid or a pressure due to a temperature condition or change.

In many places it is desirable to have indicating devices in an office or control room that makes it possible to determine the pressure or temperature of a fluid in a reservoir or container located at a distance.

In places where water is stored in reservoirs located at a distance and often in places difficult of access, it is of great importance that a person or operator shall be in position to at all times determine with a considerable degree of accuracy the height of water in the reservoir or the pressure of a gaseous fluid in a container.

Trucks and other vehicles employing pneumatic tires are frequently damaged and sometimes wrecked because the pressure in one or more of the tires falls below a critical value. Where the reduction of pressure is due to a slow leak, it frequently remains undetected until it becomes the cause of a considerable damage.

It is the object of this invention to produce a system and an apparatus for use in indicating at a distance conditions of pressure and temperature.

It is a further object to produce a pressure indicating system that can be used in connection with trucks or other automotive vehicles having a plurality of tires and which will indicate any abnormal pressure condition in any one of the tires and then permit the operator to quickly determine what tire or tires are at fault.

A still further object of the invention is to produce a pressure responsive device embodying a length of high resistance wire adapted to be connected in series in a circuit containing a delicate current meter and which will automatically change the amount of resistance in the circuit in accordance with the pressure to which the device is subjected. The resistance may either increase with the pressure or decrease as the pressure increases.

A still further object is to produce a pressure responsive variable resistance device in which the resistance will change gradually and progressively by infinitesimal increments as distinguished from step by step changes of considerable value.

A further object is to produce a variable resistance device in which a long length of resistance wire can be wound so as to occupy a small space.

Another object is to produce a system in which means is provided for automatically effecting adjustments to compensate for variations in voltage of the current source.

The above and any other objects that may become apparent as this description proceeds are attained by means of a construction and an arrangement of parts that will now be described in detail and for this purpose reference will be had to the accompanying drawing in which the invention has been illustrated and in which:

Figure 1 represents a circuit diagram showing the relationship of the several elements;

Figure 2 is a circuit diagram showing a slightly modified arrangement;

Figure 3 is a fragmentary side elevation of one of the elements, showing the same connected with a temperature responsive pressure device;

Figure 4 is a diametrical section of a slightly modified form of pressure responsive resistance;

Figure 5 is a view showing a number of the elements connected with an automobile wheel for the purpose of indicating the tire pressure;

Figure 6 is a side elevation showing a flexible resistance element on which the resistance wire is wound in a spiral;

Figure 7 is a plan view of a protective diaphragm;

Figure 8 is a plan view of an insulating ring;

Figure 9 is a plan view of the spherical contact element employed in the device;

Figure 10 is a section through the variable pressure responsive resistance showing the assembled relationship of the several elements;

Figure 11 is an enlarged partial section similar to that shown in Figure 10 and shows the parts in deflected position in which position the value of the resistance in the circuit is a minimum;

Figure 12 shows the position of the parts when the maximum amount of resistance is in the circuit; and Figure 13 is a sectional view illustrating the manner in which the resistance wire is wound and applied to a flexible diaphragm.

In the drawing reference numeral 15 designates a container which may be the inner tube of a pneumatic tire or a metal container of any kind containing either a liquid or a gaseous fluid under pressure. The container is connected with the variable resistance element 16 by means of a conduit 17, which may be composed in part of a flexible element or entirely of a rigid element as may be found desirable. Reference numeral 18 designates a battery, for example, the ignition and lighting battery employed on most automobiles and automotive vehicles. Reference numeral 19 designates an electric measuring instrument, for example, a milliammeter, and reference numeral 20 designates a stationary ring which is employed when the device is attached to an automobile and which is concentric with the axis of rotation of the wheel with which it is associated. Reference numeral 21 designates the axis of an automobile or other shaft which is mounted for rotation in a bearing 22. The shaft carries a crank arm 23 that is insulated from the shaft and which has a brush 24 that moves along one surface of ring 20.

The construction of the variable pressure responsive resistance shown diagrammatically in Figure 1 and in greater detail in Figure 10, will now be explained.

Referring now more particularly to Figure 10, reference numeral 25 designates a spherical base or body member terminating in radial flanges 26. This body member has a nipple 27 to which the flexible conduit 17 is attached for the purpose of effecting a communication with the pressure containing reservoir 15. A protective metal diaphragm 28, that is slightly spherical, is positioned against the flat surface of flange 26. Resting against the outer surface of the flat portion of diaphragm 28 are two thin metal diaphragms 29. These may be of phosphor bronze or any other suitable material and may be provided with concentric corrugations in the manner common in connection with flexible metal diaphragms employed in pressure responsive elements. These corrugations have not been shown because, in some instances, they are not necessary and since such construction is well known, it has not been illustrated. Resting on the outer surface of diaphragm 29 is a flexible diaphragm 30 which is constructed of insulating material of any suitable kind. It may be made from acetate plastic or from any other plastic, for example, the kind known as Plexiglas, and it may be constructed from rubber, either natural or synthetic. Secured to the assembly that has just been described, by means of bolts or screws corresponding in function and location to those designated by reference numeral 31, is a cover element that has been designated in its entirety by reference numeral 32. This is a spherical cup-like element having a radial flange 33 and a central spherical portion 34 provided with a threaded opening 35. The spherical portion 34 is connected with the flange by a section 36 that has an inward shoulder 37. The stationary partition or diaphragm 28 has an opening 38 through which the pressure fluid may enter so as to form contact with the inner surface of diaphragm 29. A spherical contact element 29 is positioned with its convex surface in contact with the exposed surface of the resistance wire 40 and is urged against the latter by means of a helical compression spring 41 whose inner end rests in a cup-like insulating member 42 and whose outer end rests in a cup-like member 43. Screw 44 is in threaded engagement wtih the opening 35 and has its end in rotatable engagement with cup 43. The pressure exerted on the spherical contact element can be varied or adjusted by means of screw 44 for a purpose which will hereinafter appear.

Before proceeding further with the description, the manner in which the resistance element is constructed will be explained. For this explanation the flexible diaphragm 30 will be considered as formed from acetate plastic. In Figures 11, 12 and 13 the thickness of diaphragm 30 and the diameters of the wires have both been exaggerated for the purpose of clearness. Diaphragm 30 is provided with a central opening and is positioned on shaft 45 against the surface of a plate 46 that may be made from glass or any other suitable material. Plate 46 is held against movement longitudinally of shaft 45 by means of a nut 47. Another plate 46a is positioned parallel with plate 46 and spaced from the latter by means of a ring 48. A nut 47a holds the two plates and the diaphragm in assembled relation. The wire that is to form the resistance and which has been designated by reference numeral 49 is now wound spirally about shaft 45, each turn being spaced by a silk thread 50. The winding, when seen in section, will then be as shown in Figure 13 in which the unhatched portions designate the silk cord and the hatched portions the wire. By this means, the wires, which by the way have a very small diameter, are spaced equidistantly and form a spiral in which the several coils recede progressively from the center point. During the winding a length of wire, not shown in the drawing, is provided at the center of the spiral so as to complete the spiral after the assembly has been removed.

Plate 46a is now removed and the silk cord removed by applying thereto a chemical which dissolves the same. After the silk has been removed, acetone is applied, which dissolves a layer of the surface of the acetate plastic and permits the wire to become embodied in the surface and adhesively connected thereto. After the wire has thus been attached to the diaphragm, the latter is removed and the center opening closed by means of a circular disk of the same material which is then made to adhere by means of applying thereto sufficient acetone to effect a slight softening of the members. The spiral is then completed to its innermost point. The rigid diaphragm 28, the metal diaphragm 29 and the insulating diaphragm 30 comprising the resistance wire 40 are then clamped between flange 26 and the insulating ring 50 in the manner shown in Figure 10. The outermost end of the insulating wire is connected with a conductor 51 that extends through an insulating bush 52 in the wall 36. Another wire 53 is connected with the spherical contact and passes through an insulated bushing 54.

We will now direct our attention to Figure 1 from which it will be seen that conductor 53 extends to and is connected with insulated crank arm 23 and by means of the brush 24 and conductor 54 connection is made to the measuring instrument 19 and the latter, in turn, is connected by means of a conductor 55 to one terminal of the battery 18, the other terminal being grounded at 56. Conductor 51 extends to and is connected with a spherical contact 56 that is constructed in a manner similar to spherical contact 39 and rests on the spiral resistance wires 57 carried by a flexible diaphragm 58 that is mounted in the insulating ring 59. Spring 60 tends to urge the spherical contact 56 against the resistance wires with sufficient force to bring the parts into a position like that shown in Figure 11. Contact 56 is connected by means of a bar 61 to a plunger armature 62 that is mounted for reciprocation in solenoid 63. The latter has been shown as enclosed in a soft metal housing 64 forming an iron clad electromagnet. The ends of solenoid 63 are connected with the terminals of the battery by means of conductors 65 and 66, the latter having a resistance 67 interposed therein. The outermost end of the spiral resistance wire 57 is grounded by means of a conductor 68.

It will now be seen that there is a complete circuit from the battery through the measuring instrument 19 through the slip ring connection 20, 24 and the wire 53 to the spherical contact 39. The circuit then continues through the resistance wires 40, thence through conductor 51 to spherical contact 56 and thence through resistance 57 to the ground. When the parts are stationary, the measuring instrument indicates the amount of current flowing at that time which is an inverse function of the resistance since the voltage of the battery is substantially constant. When the device is used on an automobile which is being charged whenever the engine runs the charging voltage is greater than the normal voltage of the battery and therefore, everything else being equal, measuring instrument 19 would give a different reading when the battery is being charged than when it is operating under its own voltage.

In order to compensate for the increased voltage during the charging period, resistance 57 has been introduced. It will be seen that the amount of flexure of diaphragm 58 is an inverse function of the magnetic attraction of solenoid 63 on its plunger 62 and therefore when the voltage of the battery is increased during the charging the magnet will function to reduce the pressure of contact 56 against resistance wire 57, thereby introducing more resistance in series with resistance 40. By properly proportioning the strength of the magnet to the strength of spring 60, variations in voltage between the terminal of the battery will be compensated for.

It will now be seen from the description above given, when taken in connection with the diagram of Figure 1, that whenever the value of the resistance 40 that is connected in the circuit is varied, due to the different relative positions of diaphragm 30 and the spherical contact 39, a corresponding variation in the reading of instrument 19 will take place. If the pressure in container 15 is very low, spring 41 will flex diaphragms 29 and 30 into a position like that shown in Figure 11, where practically all of the resistance wire is short circuited. If we now increase the pressure in container 15, diaphragms 29 and 30 will move towards the right, when viewed as in Figures 1 and 10, and this will break connection between the outer coils of the spiral and the spherical contact until finally the latter will connect with the center or innermost end portion of the resistance 40, whereupon all of the resistance wire will be in the circuit and this will cause the reading of instrument 19 to decrease, due to the decrease in current. By having instrument 19 quite delicate, it is possible to detect almost immediately any change in the pressure in container 15 and if container 15 is an automobile tire and if instrument 19 is positioned on the instrument board, the driver can always tell when a material change takes place in the pressure of the tire to which the instrument is connected.

In Figure 3, the variable resistance, instead of being connected with an automobile tire, or any other container of that kind, is connected to a spherical or other shaped container that contains a volatile fluid 70. When the temperature of the fluid changes, the pressure within container 69 will vary and this, in turn, will act upon the variable resistance device and by proper calibration, instrument 19 can be made to register the temperature of the fluid 17.

Figure 5, which is a diagram, shows, in a general way, how this measuring instrument can be attached to an automobile wheel. Reference numeral 71 designates a tire rim and reference numeral 72 a pneumatic tire casing provided with the ordinary inner tube. The variable resistance element is connected with the disk wheel as shown in Figure 5, and nipple 27 is connected with the valve stem 73 by means of a short flexible tube 74 that has attached thereto an ordinary valve stem 75 through which inflation may be effected. Wire 53 is connected with brush 24 which rests on the slip ring 20. Slip ring 20 is connected by means of conductor 54 to the instrument as shown in Figure 1. It will now be evident that reservoir 15 represents the tire containing air under pressure and the variation of current due to the pressure variation is indicated by instrument 19, that is positioned on the instrument board.

Figure 1 shows the arrangement when there is only one reservoir. All automobiles have four tires and a spare and some trucks have a larger number of tires. If this device is attached to an automobile, it is, of course, necessary to have means for indicating the pressure conditions in all of the tires and one way of achieving this is to have a separate circuit for each wheel arranged as shown in Figure 1. This requires an instrument 19 corresponding to every wheel and where five or more wheels are used, a corresponding number of instruments must be supplied.

In Figure 2 an arrangement has been shown in which the pressure in a number of reservoirs can be made to affect a variation in reading of a single indicating instrument 19 so that this will indicate low pressure in any of the wheels or tires connected therewith. In this circuit, means has also been provided for determining which one of the tires or reservoirs is responsible for the variation in reading.

With the arrangement of parts shown in Figure 2, each wire 54 terminates in a contact 76 arranged in the path of a movable switch arm 77. This switch arm is connected with the instrument by conductor 54a. It is evident that whenever switch arm 77 is connected with any one contact, the circuit is like that shown in Figure 1 and the instrument 19 is then effected by the pressure of that one reservoir only. Switch arm 77 has been shown as provided with a segment shaped contact arm 78 that, in the open position of the switch, makes connection with all of the contacts 76a. Contacts 76a are connected in parallel with contact 76 by the three conductors 79. With the parts in the position shown in Figure 2, if the pressure in any one of the several tires or containers 15 decreases the additional amount of current thus permitted to flow through the resistance connected therewith will immediately be indicated by the instrument 19. The driver or operator will thus see that one of his tires is low and by moving contact arm 77 over the contacts 76, he tests each tire separately and thereby locates the one that is responsible for the variation in reading. This, therefore, enables the driver, without leaving his seat, first to ascertain that at least one of the tires has a low pressure, and enables him also to determine which one of the many tires is thus affected.

Under certain conditions it may be desirable to so arrange the parts that the decrease in pressure will increase the value of the resistance in the circuit and such an arrangement has been shown in Figure 4. In this arrangement, the contact 39 is positioned in the pressure chamber as is also spring 41. Diaphragm 30 is constructed in the manner described, but is reversed having the resistance wire 40 in the pressure chamber and a spherical member 80 is urged against the other side of diaphragm 30 by means of spring 81, whose tension can be adjusted by means of screw 44. With this arrangement any increase in pressure will reduce the amount of resistance in the circuit instead of increasing it as in the other embodiment. This reversal may be desirable, under certain circumstances, and Figure 4 has been presented primarily for the purpose of showing how such a reversal can be effected. Applicant understands, however, that a mere reversal does not involve invention, but he desires to be put on record as showing how this reversal can be effected within the scope of his claims.

Having described the invention what is claimed as new is:

1. A pressure responsive variable resistance device, comprising a cup-like housing, a flexible diaphragm closing the open end thereof, means comprising a spring for urging the diaphragm towards the closed end of the housing, one side of the diaphragm having a resistance wire wound spirally thereon, an electric conductor connected with the outer end of the spiral, a slightly convex spherical conductor electrically connected with the innermost end of the spiral, means comprising a spring for urging the spherical contact against the resistor element whereby when the diaphragm is flexed in response to a fluid pressure, the length of resistance wire between the two contact points will be a measure of the pressure.

2. A resistance for use in measuring a fluid pressure comprising, a body having a recess on one side, a flexible diaphragm closing the recess forming a chamber adapted to be connected with a source of fluid under pressure, the outer surface of the diaphragm having wound thereon a high resistance wire, in the form of a spiral, the adjacent coils being insulated from each other, a cover member extending over the outer surface of the diaphragm, a contact element having one side spherical positioned with its pole in electrical contact with the center of the spiral, a compression spring positioned between the cover member and the spherical contact urging the latter against the diaphragm producing a flexure of the latter to a point where the force exerted by the spring balances the opposing force due to the fluid in the pressure chamber, the length of wire in contact with the spherical surface increasing by infinitesimal lengths as the flexure increases, the amount by which the resistance is decreased being a measure of the pressure in the pressure chamber.

3. A variable resistance device for use in a pressure indicator comprising, a body having a recess on one side, a flexible diaphragm closing the recess forming a closed pressure chamber, one side of the recess having a resistance wire secured thereto, the wire being coiled into a spiral, a spherical contact element resting on the wire coils forming the spiral, and means comprising a spring for urging the spherical contact against the wire spiral whereby as the diaphragm bends in response to the pressure of the spring, the length of wire from the center that comes into electrical contact with the spherical contact will increase in infinitesimal increments as the flexure increases until a balance is attained between the pressure exerted by the spring and that on the opposite side of the diaphragm.

FLOYD T. LINSTROM.

REFERENCES CITED

The following references are of record in the file of this patent:

UNITED STATES PATENTS

| Number | Name | Date |
|---|---|---|
| 2,071,256 | Dobbs | Feb. 16, 1937 |
| 2,112,371 | Korvec | Mar. 29, 1938 |
| 2,195,813 | DeGiers | Apr. 2, 1940 |
| 2,264,487 | Smulski | Dec. 2, 1941 |
| 2,275,237 | Smulski | Mar. 3, 1942 |
| 2,286,717 | Clason | June 16, 1942 |